United States Patent
Fan et al.

(10) Patent No.: US 12,006,251 B2
(45) Date of Patent: Jun. 11, 2024

(54) MICRO-OPTICAL ELEMENT HAVING HIGH BONDING STRENGTH BETWEEN GLASS SUBSTRATE AND MICRO-STRUCTURE LAYER

(71) Applicant: SCHOTT Glass Technologies (Suzhou) Co. Ltd., Jiangsu (CN)

(72) Inventors: Huiyan Fan, Jiangsu (CN); Yanquan Shan, Jiangsu (CN); Guangjun Zhang, Shanghai (CN); Weizhi Deng, Jiangsu (CN)

(73) Assignee: SCHOTT GLASS TECHNOLOGIES (SUZHOU) CO. LTD., Jiangsu (CN)

( * ) Notice: Subject to any disclaimer, the term of this patent is extended or adjusted under 35 U.S.C. 154(b) by 913 days.

(21) Appl. No.: 17/012,183

(22) Filed: Sep. 4, 2020

(65) Prior Publication Data

US 2021/0070654 A1    Mar. 11, 2021

Related U.S. Application Data

(63) Continuation of application No. PCT/CN2019/104774, filed on Sep. 6, 2019.

(51) Int. Cl.
| | | |
|---|---|---|
| *C03C 3/078* | (2006.01) | |
| *C03C 3/097* | (2006.01) | |
| *C03C 3/108* | (2006.01) | |
| *C03C 17/32* | (2006.01) | |
| *C03C 19/00* | (2006.01) | |

(52) U.S. Cl.
CPC .............. *C03C 19/00* (2013.01); *C03C 3/078* (2013.01); *C03C 3/097* (2013.01); *C03C 3/108* (2013.01); *C03C 17/326* (2013.01); *C03C 2204/08* (2013.01); *C03C 2217/90* (2013.01); *C03C 2218/112* (2013.01); *C03C 2218/116* (2013.01); *C03C 2218/32* (2013.01)

(58) Field of Classification Search
CPC ......... C03C 19/00; C03C 3/078; C03C 3/097; C03C 3/108; C03C 17/326; C03C 2204/08; C03C 2217/90; C03C 2218/112; C03C 2218/116; C03C 2218/32; C03C 3/085; C03C 17/32; C03C 3/091; C03C 3/089; C03C 17/002; C03C 2218/328; G02B 1/04; G02B 30/00; G02B 3/0006; G02B 5/00; G02B 3/00; G02B 5/021; G02B 5/18

See application file for complete search history.

(56) References Cited

U.S. PATENT DOCUMENTS

| | | |
|---|---|---|
| 2006/0009343 A1 | 1/2006 | Fechner |
| 2006/0051584 A1 | 3/2006 | Bieck |
| 2009/0142568 A1 | 6/2009 | Dejneka |
| 2016/0002103 A1 | 1/2016 | Wang |
| 2016/0248047 A1 | 8/2016 | Lee |
| 2017/0047362 A1 | 2/2017 | Alasirniö |
| 2018/0230045 A1 | 8/2018 | Ohkawa |
| 2020/0115272 A1 | 4/2020 | Li |

FOREIGN PATENT DOCUMENTS

| | | | |
|---|---|---|---|
| CN | 1724428 | | 1/2006 |
| CN | 101082769 | | 12/2007 |
| CN | 101910079 | | 12/2010 |
| CN | 103913793 | | 7/2014 |
| CN | 105684181 | | 6/2016 |
| CN | 109052935 | | 12/2018 |
| EP | 3093139 | | 11/2016 |
| EP | 3366989 | | 8/2018 |
| JP | 2011021177 | | 2/2011 |
| JP | 2012158825 | A * | 8/2012 |
| WO | 0139986 | | 6/2001 |
| WO | 2003096123 | | 11/2003 |
| WO | 2018094017 | | 5/2018 |
| WO | 2018100991 | | 6/2018 |
| WO | 2019001093 | | 1/2019 |

OTHER PUBLICATIONS

International Search Report dated Jun. 12, 2020 for corresponding International Application PCT/CN2019/104774.
Written Opinion of International Searching Authority dated Jun. 12, 2020 for corresponding International Application PCT/CN2019/104774.

* cited by examiner

Primary Examiner — K. Boyle
(74) Attorney, Agent, or Firm — Ruggiero McAllister & McMahon LLC

(57) ABSTRACT

A micro-optical element is provided that includes a glass substrate, a microstructure layer, and a bonding strength between the glass substrate and microstructure layer. The glass substrate has a thickness of less than or equal to 1500 μm and exhibits a glue contact angle of less than 45°. The microstructure layer is formed from polymer imprinted on the glass substrate. The bonding strength is larger than 0.5 MPa.

24 Claims, 3 Drawing Sheets

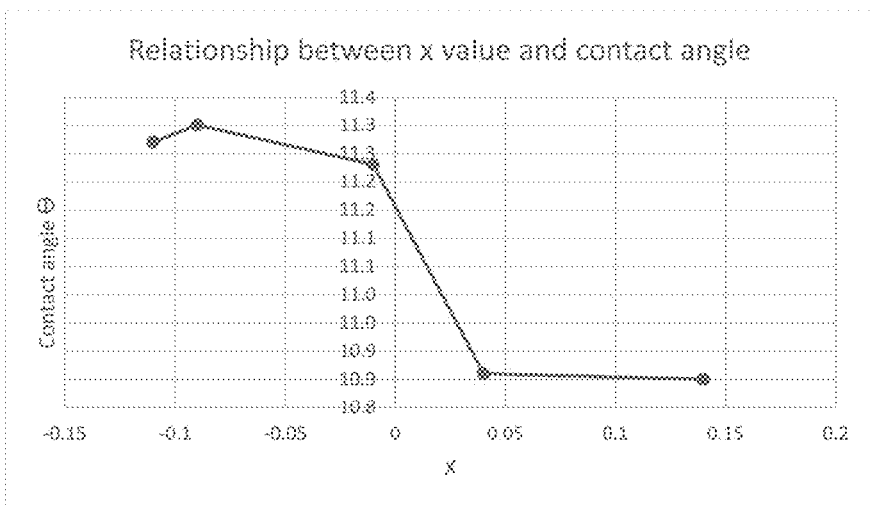
FIG. 3
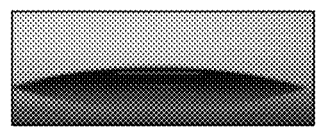
FIG. 4A FIG. 4B FIG. 4C
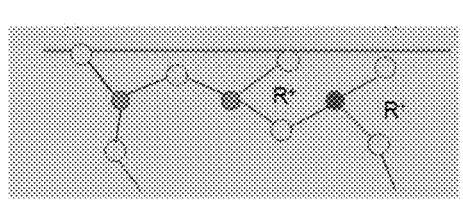
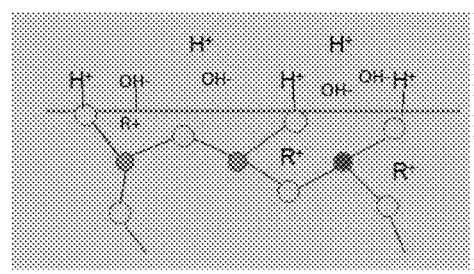
FIG. 5A FIG. 5B

MICRO-OPTICAL ELEMENT HAVING HIGH BONDING STRENGTH BETWEEN GLASS SUBSTRATE AND MICRO-STRUCTURE LAYER

CROSS REFERENCE TO RELATED APPLICATIONS

This application is a continuation of International Application PCT/CN2019/104774 filed Sep. 6, 2019, the entire contents of all of which are incorporated herein by reference.

BACKGROUND OF INVENTION

1. Field of Invention

The present invention relates to a micro-optical element, in particular wafer level optics, in 3D imaging and sensing fields. In particular, the present invention relates to a micro-optical element having a glass substrate and a microstructure layer bonded with each other and having high stability due to tight bonding between the glass substrate and the microstructure layer.

2. Description of Related Art

For micro-optical element having a glass substrate and a microstructure layer, bonding strength between the glass substrate and the microstructure layer is a critical requirement, since delamination of the microstructure layer from the glass substrate is always the problem and concerns.

To reliably achieve a bonding surface between the glass substrate and the microstructure layer with high bonding strength, Koji et al., in EP 3093139 A1, proposed a Fresnel lens made of a thermoplastic polymer composition including an acrylic block copolymer (A) and an acrylic resin (B), in which the acrylic block copolymer (A) is an acrylic block polymer that includes, within its molecule, at least one structure in which a polymer block (a2) mainly composed of a methacrylic ester unit is bonded to each terminal of a polymer block (a1) mainly composed of an acrylic ester unit. The thermoplastic polymer composition can be reliably bonded with a silane coupling agent applied to the glass substrate. However, synthetization of acrylic block copolymer (A) is time and effort consuming as well expensive in production cost, which is not economic.

Therefore, in the field of micro-optics, there are still some requirements for providing a micro-optical element between the glass substrate and the microstructure layer, but with less effort as well lower cost.

SUMMARY

The object of the present application is to provide a micro-optical element having a glass substrate and a microstructure layer bonded with each other and having high stability due to tight bonding between the glass substrate and the microstructure layer.

This object is solved by a glass substrate with specific glass composition and optimized geometrical, surface properties as claimed in the independent claims. Glass composition with high non-bridge oxygen (NBO) or active oxygen can generate OH—, which can increase the bonding strength with microstructure layer. The glass substrate has suitable total thickness variation (TTV), thickness tolerance, and warp, which are benefit to get high bonding strength with a consistent microstructure layer. High TTV and warp are not benefit to get stable production process of microstructured polymer layer because the thickness of polymer is influenced by the TTV and warp of glass. On the other hand, the microstructure layer can also be influenced by glass roughness during spin coating, spray coating, deposition or imprinting process. Low glass roughness is benefit to polymer spread on glass, which is good to form consistent microstructure layer.

In accordance with one aspect of the present invention, a micro-optical element comprising: a glass substrate and a microstructure layer. The glass substrate has a thickness t≤1500 μm, preferably t≤1200 μm, more preferably t≤1100 μm; and other thickness 900 μm, 800 μm, 700 μm, 500 μm, 400 μm, 300 μm, 200 μm, 100 μm can also be used. But the thickness of glass in this patent does not restrict within the mentioned thickness above. The microstructure layer formed from polymer is imprinted on the glass substrate. The microstructure has an optical functions by optical design. The microstructure could be any structure (e.g., Hemisphere, multistep, circle, square) which can generate refractive effect or diffractive effect in optics according to optical design. The glass substrate exhibits a glue contact angle θg of less than 35°, preferably less than 25°, more preferably less than 15°. The bonding strength P is defined the minimum pressure than can separate microstructure layer from glass substrate. The bonding strength between the glass substrate and the microstructure layer is larger than 0.5 MPa, preferably higher than 1 MPa, more preferably higher than 1.5 MPa. The regression of bonding strength is less than 60%, preferably less than 50%, more preferably less than 40% after 1000 times of cycle at 85° C. temperature and 85% humidity.

In a further preferable embodiment, the glass substrate has a refractive index $n_d$ in a range from 1.4 to 2.5, preferably in a range from 1.41 to 2.1, preferably in a range from 1.42 to 2.0, preferably in a range from 1.45 to 1.9, in particular preferably in a range from 1.45 to 1.8, more preferably in a range from 1.45 to 1.7, most preferably in a range from 1.45 to 1.6. In this case, the glass substrate is adoptable for the application in optics. In one embodiment, the difference of the refractive index $n_d$ between the glass substrate and the microstructure layer $\Delta n_d$<0.5.

In a preferable embodiment, the glass substrate has a number of Non-Bridge Oxygen NBO>0.3, preferably NBO>0.5, more preferably NBO>1, in particular preferably NBO>1.5 and most preferably NBO>2, wherein NBO= $(R_2O+R'O)/(P_2O_5+Al_2O_3+B_2O_3+TiO_2+ZrO_2)$. A ratio $X=(R_2O+R'O-P_2O_5-Al_2O_3-B_2O_3)/(SiO_2+P_2O_5+Al_2O_3+B_2O_3)$ is more than −0.2, preferably more than 0 and more preferably more than 0.2. In the present invention, R is alkali metal, including Li, Na, K; and R' is alkali earth metal, including Mg, Ca, Ba.

In a further preferable embodiment, the glass comprising the following composition in mol % based on oxide:

| Components | Proportion (mol %) |
| --- | --- |
| SiO2 | 60-83 |
| B2O3 | 0-12 |
| Na2O | 0-13 |
| K2O | 0-7 |
| MgO | 0-7 |
| CaO | 0-10 |
| BaO | 0-1 |
| TiO2 | 0-4 |
| ZnO | 0-6. |

In a preferably embodiment, the glass substrate has a surface tension σ≥100 dyn/cm at 1300° C. in particular preferably σ≤120 dyn/cm at 1300° C., more preferably σ≥140 dyn/cm at 1300° C. Higher surface tension results in smaller water/glue contact angle, which increases bonding strength between glass and microstructure layer.

Total Thickness Variation (TTV) is the difference between the minimum and maximum values of thickness over the glass. TTV is identified in a scan pattern or by carrying through series of point measurements on the glass. In a further preferable embodiment, the glass substrate has a total thickness variation (TTV) TTV≤40 µm, preferably TTV≤30 µm, more preferably TTV≤20 µm, in particular preferably TTV≤10 µm, and most probably TTV≤5 µm. In this case, due to the low TTV, the bonding strength between the glass surface and the microstructure layer is homogeneous and improved.

In a further preferable embodiment, the glass substrate has a thickness tolerance δ≤80 µm, preferably δ≤50 µm, more preferably δ≤20 µm, further preferably δ≤10 µm, in particular preferably δ≤5 µm and most preferably δ≤2 µm.

In a further preferable embodiment, the glass substrate exhibits a warp 500 µm, preferably 100 µm, more preferably ≤80 µm, and most preferably ≤50 µm. In this case, the glass substrate can be substantially parallel to the microstructure layer, which might improve the homogeneous bonding strength between the glass substrate and microstructure layer.

In a further preferable embodiment, the glass substrate exhibits a ratio of TTV (Total Thickness Variation) to thickness less than 10%, preferably less than 8% and more preferably less than 5%.

In a further preferable embodiment, the glass substrate has a surface roughness Ra≤20 nm, preferably Ra≤10 nm, and more preferably Ra≤5 nm. In this case, due to the low surface roughness, it can be avoided of the empty adhesive layer between the glass substrate and microstructure layer and homogeneous thickness of the adhesive layer is achieved. Low glass roughness is benefit to polymer spread on glass, which is good to form consistent microstructure layer. On the other hand, optical properties can be reduced by high roughness.

In a further preferable embodiment, the glass substrate exhibits a transmission index T≥90%, preferably T≥91%, more preferably T≥92% at a light wavelength in a range from 400 to 1500 nm. Glass substrate can have coating on it. By coating, e.g. anti-refractive coating, transmission can be T≥95% and more preferably T≥99%.

In a further preferable embodiment, the glass substrate exhibits a Coefficient of Thermal Expansion $CTE_{20-300°\ C.}\leq 15\times 10^{-6}/K$, preferably $CTE_{20-300°\ C.}\leq 10\times 10^{-6}/K$. Additionally, the glass substrate exhibits a $CTE_{glass}$ with a ration to the $CTE_{polymer}$ of the microstructure layer of $CTE_{polymer}/CTE_{glass}\leq 100$, preferably $CTE_{polymer}/CTE_{glass}\leq 80$.

In a further preferable embodiment, the difference of the refractive index na between the glass substrate and the microstructure layer $\Delta n_d \leq 0.5$.

In this embodiment, diffractive optical elements, DOEs, were designed for applications with lasers and high-power lasers. Used as multi-spot beam splitters, in beam shaping, and beam profile modification, such elements offer endless possibilities in different application fields. The DOE is adoptable for the application in optics, in particular diffractive optical element or refractive optical element, all those optical elements can be in the 3D imaging and sensing fields or the fields that needs the function of depth detection or recognition such as entertainment, posture recognition, tracking of hand articulations, and facial recognition system, augment reality, virtue reality.

In a further preferable embodiment, the glass substrate is made of a glass selected from the group consisting of silicate glasses, borosilicate glass, aluminosilicate glasses, aluminum borosilicate glass, soda lime glass and lithium aluminum silicate glass (LAS).

In a further preferably embodiment, the microstructure layer consists of a polymer selected from the group consisting of epoxy resins and acrylic resins. Polymer may contain some inorganic material, e.g. $SiO_2$, to increase refractive index of the polymer. But the polymer is not limited to the above mentioned polymers. Any polymer that can form the desired microstructure can be used to make the microstructure layer.

In another aspect of the present invention, a method for manufacturing the micro-optical element mentioned above is provided. The method includes the following steps: providing a glass substrate with a thickness t≤1500 µm, preferably t≤1200 µm, more preferably t≤1100 µm, and wherein the glass substrate has a Total Thickness Variation TTV≤40 µm, preferably TTV≤30 µm, more preferably TTV≤20 µm, in particular preferably TTV≤10 µm and most probably TTV≤5 µm; the glass substrate has a thickness tolerance δ≤80 µm, preferably δ≤50 µm, more preferably δ≤20 µm, further preferably δ≤10 µm, in particular preferably δ≤5 µm and most preferably δ≤2 µm, applying a microstructured polymer layer to the glass substrate, wherein the microstructure profile can be periodic structure of pyramid, circle, triangle, square, jagged, diffraction grating comprising a metasurface having 2-phase level, asymmetric geometric phase optical elements and other unlimited optical elements according to the optical design.

The application of the microstructured polymer layer to the glass substrate consists of the three major process steps: origination, replication, and pattern transfer, namely: polymer is deposited onto a substrate, and a UV-transparent template is positioned above; the template is pressed into the polymer and UV light or heat is shone through the template to cure the polymer; and the template is released leaving the cured polymer with the imprinted features, to form a microstructure layer, wherein the template can be made from metal, quartz or other suitable materials and the polymer can be cured by heating, UV flash or other suitable methods.

In a further preferable embodiment, the microstructure layer can be alternatively applied by imprinting, spin coating, spray coating or deposition and not limited methods In a further preferable embodiment, the microstructure layer can be alternatively cured by thermal heating or similar method.

In a further preferable embodiment, the microstructure layer can be applied onto two side surfaces of the glass substrate.

In the present invention, the glass shows a high NBO number, and thus, the glass has more oxygen with negative charge (so called "active oxygen"). It is founded that higher NBO number or more active oxygen can generate a high active glass surface which can increase the wettability of the glass surface and reduce the water/glue contact angle. The good glass surface wettability and low water/glue contact angle is good to the bonding strength of glass and the glue, i.e., adhesive layer, which increases the stability.

The micro-optical element according to the present invention can be used diffractive optical element, refractive lens, mirror, prism, GRIN len, hybrid element, diffuser in 3D imaging/sensor, augmented reality, Virtual reality, cameras, automated manufacturing systems, mobile communications.

BRIEF DESCRIPTION OF THE DRAWINGS

FIG. 3 is a sampled curve of relationship between the contact angle and X value;

FIGS. 4A to 4C are glue contact angles of the glasses according to the present invention;

FIGS. 5A to 5B are schematic views of bonds on surface of glasses according to the prior art and the present invention;

DETAILED DESCRIPTION

The objects, features and advantages of the invention are illustrated in more detail by the examples and embodiments as described in the following with reference to the accompanying drawings.

Figure 1:
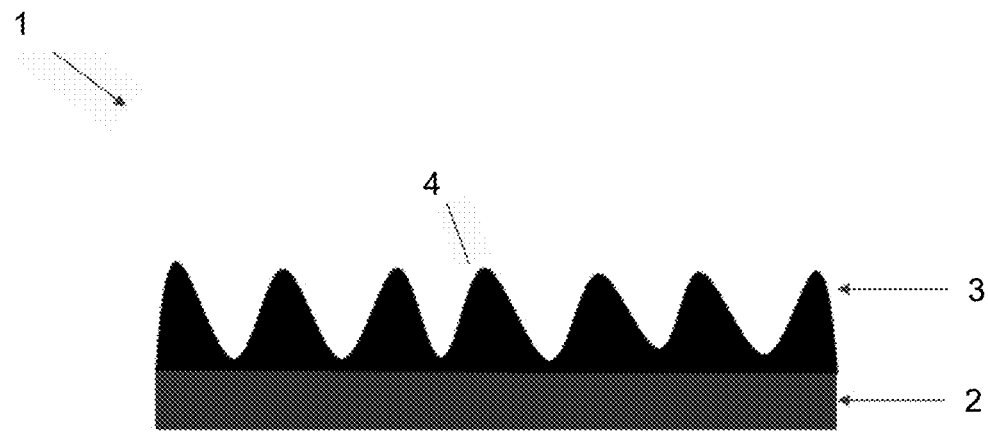
FIG. 1 is a simplified view of a micro-optical element with a glass substrate and a microstructures layer.

FIG. 1 shows a simplified view of a micro-optical element 1 with a glass substrate 2 and a microstructure layer 3 according to the present invention, which are directly bonded together. The microstructure layer 3 is imprinted onto the glass substrate 2 with optical structures, e.g., lens 4 in this embodiment, on the top thereof. In the present invention, the optical structures are not limited to the lens 4 and may include other optical elements, e.g., sensors. For the microstructure layer 3, it is generally made of polymer including epoxy resin, such as DELO® KATIOBOND® OM 614, which is a kind of glue, as UV-curing imprint material, and acrylic resin. However, the polymer is not only limited to the epoxy resin and acrylic resin, but also including other polymer having the property of glue.

The glass substrate 2 is made of an ultrathin glass selected from the group consisting of silicate glasses, borosilicate glass, aluminosilicate glasses, aluminum borosilicate glass, soda lime glass and lithium aluminum silicate glass (LAS). The ultra-thin glass according to the present invention can be manufactured by the processes, e.g., down draw, up draw, floating or overflow fusion.

The glass substrate 2 has a thickness $t \leq 800$ μm, preferably $t \leq 500$ μm, more preferably $t \leq 100$ μm. The glass substrate 2 exhibits a glue contact angle $\theta g$ of less than 5°, preferably less than 40°, more preferably less than 30°, and most preferably less than 15°. In this case, due to the low glue contact angle $\theta g$ of the glass substrate 2, it is good to the bonding strength of the glass substrate with the microstructure layer 3, increasing the reliability and stability.

It was found that the glue contact angle $\theta g$ of the glass substrate is determined by specific parameters of the glass. Briefly, as mentioned above, the high non-bridge oxygen (NBO) can generate more oxygen with negative charge ("active oxygen") and high NBO or more active oxygen can generate a high active glass surface which can increase the wettability of the glass surface and reduce the water/glue contact angle. The good glass surface wettability and low water/glue contact angle is good to the bonding strength of the glass with the glue, e.g., microstructure layer 3 in this case, increasing the stability. In the present invention, the NBO is defined by the equation (1) as below:

$$NBO = (R_2O + R'O)/(P_2O_5 + Al_2O_3 + B_2O_3 + TiO_2 + ZrO_2) \quad (1)$$

wherein R is alkali metal, including Li, Na, K; and R' is alkali earth metal, including Mg, Ca, Ba.

In the present invention, the glass substrate has a certain number of NBO. The large number of NBO can increase the performance, reliability, and bonding strength of bonding between the glass substrate 2 and the microstructure layer 3. Larger NBO can attract more OH on the glass surface, and in turn, more OH on the glass surface can result in better liquid wettability, thus increasing the bonding strength between the glass substrate 2 and the microstructure layer 3. Additionally, the large number of NBO can lower the water/glue contact angle, and in turn, lower contact angle results in better bonding strength. It was found that, if the value of NBO is larger than 1, it means there is enough modifier, which provide NBO in the glass substrate and the glass structure is loose. If the value of NBO is smaller or equal to 1, it means there is not enough glass modifier in the glass substrate and the glass structure is compact. In the present invention, the glass substrate has a value of NBO larger than 0.3, preferably larger than 0.5, more preferably larger than 1, in particular preferably larger than 1.5 and most preferably larger than 2.

Additionally, to evaluate the ratio of active oxygen in the glass, a special ratio $X = (R_2O + R'O - P_2O_5 - Al_2O_3 - B_2O_3)/(SiO_2 + P_2O_5 + Al_2O_3 + B_2O_3)$ is defined. It shows that the active oxygen increases with the increasing of X value. That is to say, if X is larger, it means there are more active oxygen. If X>0, it means there is enough active oxygen in the glass substrate, and the glass substrate, especially the glass surface is active. In briefly, when X>0, there is enough non-bending oxygen ion on glass surface and the active oxygen is easily to react with moisture in the air to form [OH—] group. The active [OH—] group is benefit to increase the wettability between the glass substrate 2 and microstructure layer 3, i.e., polymer, and to reduce contact angle between the glass substrate 2 and the microstructure layer 3. The surface adhesive ability of the glass substrate can be improved by the active oxygen and active [OH—] group.

It was found from experiments that, if glass has a low X value, e.g., $X \leq -0.2$, it means all the oxygen are bonded with glass former cations (e.g., Si, Al, B, P) and the glass is insert. In this case, there are no enough [OH—], which can be formed on the glass surface. Additionally, it was found that, if the glass has a high X value, e.g., $X \geq -0.2$, it results to sufficient active [OH] groups on glass surface and smaller wetting contact angle with glue on the glass substrate. This special property is benefit to the glass application on wafer level optics and diffractive optical element. According to the present invention, the glass substrate has a ratio $X \geq -0.2$, preferably $\leq 0$ and more preferably $\leq 0.2$.

To provide higher value of NBO, in the present invention, the glass comprises the following composition in mol % based on oxide:

| Components | Proportion (mol %) |
| --- | --- |
| $SiO_2$ | 60-83 |
| $B_2O_3$ | 0-12 |
| $Na_2O$ | 0-13 |
| $K_2O$ | 0-7 |
| $MgO$ | 0-7 |
| $CaO$ | 0-10 |
| $BaO$ | 0-1 |
| $TiO_2$ | 0-4 |
| $ZnO$ | 0-6. |

The glasses used in the invention, in particular the above mentioned glasses, can also be modified. For example, the color can be modified by adding transition metal ions, rare earth ions as e.g. $Nd_2O_3$, $Fe_2O_3$, CoO, NiO, $V_2O_5$, $MnO_2$, $TiO_2$, CuO, $CeO_2$, $Cr_2O_3$, and 0-2 wt. % of $As_2O_3$, $Sb_2O_3$, $SnO_2$, $SO_3$, Cl, F, and/or $CeO_2$ into the glass compositions.

The glass article can also be provided with an antimicrobial function or chemical toughening by applying an ion-exchange of the glass article in a $K^+$, $Na^+$, $Ag^+$-containing salt bath or a $Cu^{2+}$-containing salt bath. After the ion-exchange, the concentration of $Ag^+$ or $Cu^{2+}$ is higher than 1 ppm, preferably higher than 100 ppm, and more preferably higher than 1000 ppm.

The micro-optical element 1 needs high reliability and high optical efficiency due to its requirements of performance. To meet these requirements, it is necessary to achieve high bonding between the glass substrate 2 and the microstructure layer 3. To ensure this point, the glass substrate 2 shall have specific geometry properties, e.g., surface roughness, Total Thickness Variance (TTV) and warp as well as the Coefficient of Thermal Expansion (CTE). These properties might influence the bonding reliability between the glass substrate and the microstructure layer.

In the present invention, the glass substrate 2 has a Total Thickness Variation TTV≤40 μm, preferably TTV≤30 μm, more preferably TTV≤20 μm and most preferably TTV≤10 μm. In this case, due to the low TTV, the microstructure layer 3 homogeneously contacts the surface of the glass substrate 2 and the bonding between the microstructure layer 3 and the glass substrate 2 is increased.

Further, to improve the bonding strength between the glass substrate and the microstructure layer, the glass substrate has a Local Thickness Variation LTV≤5 μm, preferably LTV≤1 μm, more preferably LTV≤0.5 μm, and most preferably LTV≤0.1 μm at 25 mm², since the LTV influences the bonding strength between the glass substrate and the microstructure layer in the same way as the TTV.

Additionally, the glass substrate has a thickness tolerance δ≤80 μm, preferably δ≤50 μm, more preferably, δ≤20 μm. In an embodiment, the glass substrate exhibits a ratio of tolerance to thickness less than 10%, preferably less than 8% and more preferably less than 5%. Since the thickness tolerance δ and ratio of tolerance to thickness is very low, the light incident onto the micro-optical element can transmit through the glass substrate homogeneously, and thus, the imaging quality is improved.

To further improve the bonding strength between the glass substrate and microstructure layer, the glass substrate exhibits a warp≤200 μm, preferably ≤100 μm, more preferably ≤80 μm, and most preferably ≤50 μm. In this case, the glass substrate can be substantially parallel to the microstructure layer, which might improve the homogeneous bonding strength between the glass substrate 2 and the microstructure layer 3. Additionally, this also can improve the quality of the micro-optical element in light transmission or reflectivity as required.

To further improve the bonding strength between the glass substrate and the microstructure layer, the glass substrate 2 according to the present invention has a surface roughness Ra≤20 nm, preferably Ra≤10 nm, and more preferably Ra≤5 nm.

In accordance to the requirement of the micro-optical element in term of optics, the glass substrate 2 should exhibit some property in term of optics. In a further preferable embodiment, the glass substrate 2 has a refractive index na in a range from 1.4 to 2.5, preferably in a range from 1.5 to 2.3 and more preferably in a range from 1.8 to 2.0. In this case, the refractive index na listed above matches with the existing polymers for the microstructure layer, and thus, improves the optical efficiency, so that the glass substrate is adoptable for the application in optics. In a preferable embodiment, the difference $\Delta n_d$ of the refractive index na between the glass substrate and the microstructure layer is less than 0.5.

In accordance to the requirements of the micro-optical element in term of optics, the glass substrate 2 exhibits a transmission index T≥90%, preferably T≥91% and more preferably T≥92% at a light wavelength in a range from 400 to 1500 nm. In this embodiment, the glass substrate is adoptable for the application in optics, in particular in the 3D imaging and sensing fields.

To reduce the delamination of the microstructure layer 3 from the glass substrate 2 when subjecting to thermal impact, the Coefficient of Thermal Expansion $CTE_{20\text{-}300°\ C.}$ (CTE) of the glass substrate should not be much different from that of the microstructure layer. In ideal condition, the CTE of the glass substrate is substantial equal to that of the microstructure layer. In this case, when micro-optical element is subjected to thermal shock, the glass substrate and the microstructure layer expand similarly and no displacement there between occurs. In an embodiment of the present invention, the glass substrate exhibits a $CTE_{20\text{-}300°\ C.}$≤15× $10^{-6}$/K, preferably $CTE_{20\text{-}300°\ C.}$≤12×$10^{-6}$/K.

Furthermore, bonding strength between the glass substrate and the microstructure layer are a critical requirement for micro-optical element by using e.g., nanoimprint technology. Delamination is always the problem and concern. This present invention is to provide a glass substrate with suitable surface properties, e.g., high surface tension, low surface tension ratio between glass substrate and the microstructure layer, a certain number of NBO, to increase glass surface tension and surface wettability, which is helpful to improve the bonding strength between the glass substrate and the microstructure layer. It is found that, higher surface tension results in smaller water/glue contact angle, which increases the surface adhesive ability of the glass substrate.

EXAMPLES

TABLE 1 shows several examples of glass substrate according to the present invention.

| Component | Proportion (mol %) | | | | |
|---|---|---|---|---|---|
| | Example-1 | Example-2 | Example-3 | Example-4 | Example-5 |
| $SiO_2$ | 66 | 64 | 67 | 83 | 76 |
| $Al_2O_3$ | 11 | 4 | 11 | 2 | 13 |
| $B_2O_3$ | 0 | 8 | 10 | 12 | |
| $R_2O$ | 16 | 13 | 0 | 4 | 0 |
| R'O | 7 | 6 | 11 | 0 | 12 |
| R"$O_2$ | 1 | 4 | | | |
| Parameters | | | | | |
| NBO | 1.94 | 1.16 | 0.54 | 0.33 | 0.92 |
| X = ($R_2O$ + R'O − Al − B − P)/($SiO_2$ + $Al_2O_3$ + $B_2O_3$ + $P_2O_5$) | 0.14 | 0.04 | −0.11 | −0.09 | −0.01 |
| Glue contact angle (°) | 10.8 | 10.8 | 11.2 | 11.3 | 11.2 |
| Bonding strength (MPa) | 7 | 7 | 6 | 6 | 5 |

R is alkali metal, including Li, Na, K;
R' is alkali earth metal, including Mg, Ca, Ba; and
R" includes Ti, Zr, but not include Si.

From TABLE 1 above, taking the glass of Example-2 as an example, the glass offer much large number of NBCO, e.g., 1.16, and thus, offer higher value of the ratio X=−0.11. In this case, it will attract more OH— on the surface of the glass and results in better liquid wettability.

In detail, referring to FIGS. 4A to 4C, which respectively show the glue contact angles of the glasses with respect to Example-2, Example-5 and Example-3 respectively having glue contact angles of 10.8°, 11.2° and 11.3°. In this case, in conjunction of FIG. 7, the binding strength between the glass substrate and the microstructure layer are 7 MPa, 6 MPa and 5 MPa.

Figure 2:
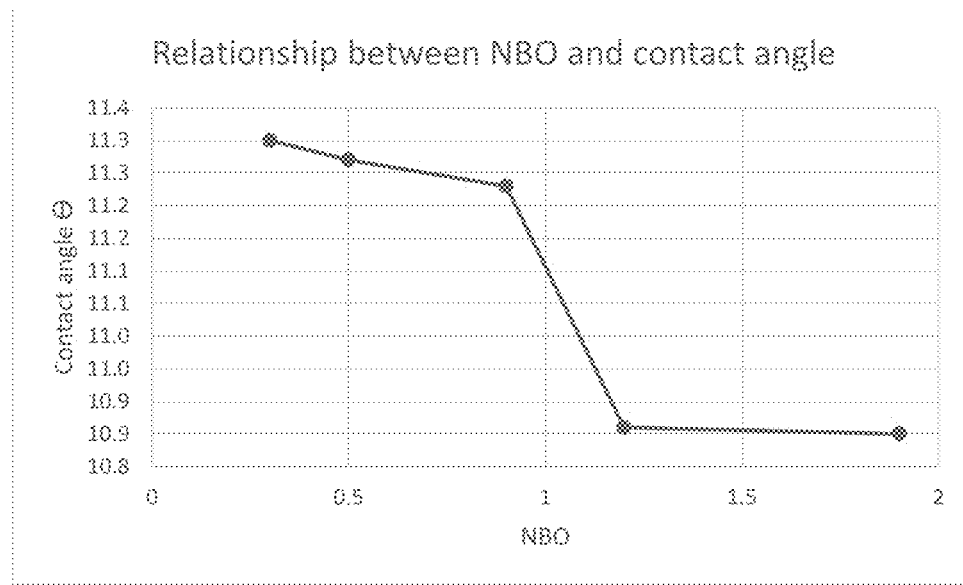
FIG. 2 is a sampled curve of relationship between contact angle and NBO value
Figure 6:
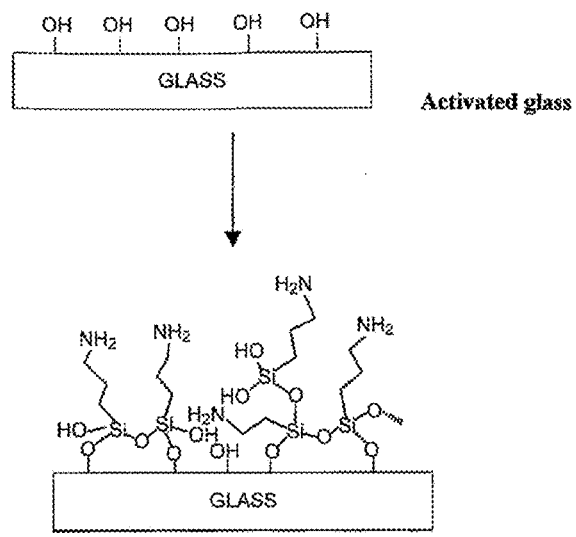
FIG. 6 is a schematic view of activated glass and chemical bonding with microstructure layer according to the present invention.

FIGS. 2 and 3 respectively show the relationship between glue contact angles and the NBO and X value. From these two figures, it can be determined that the higher values of NBO and X, the smaller glue contact angle, which in turn improve the bonding strength and stability of the glass substrate 2 and the microstructure layer 3.

FIGS. 5A and 5B show the schematic views of radical groups for bonding on one surface of the glass. FIG. 5A shows the schematic view of radical groups for bonding on one surface of the glass with low value of NBO and less active oxygen on the surface of the glass. FIG. 5B shows the schematic view of radical groups for bonding on one surface of the glass with high value of NBO and more active oxygen on the surface of glass.

Figure 7:
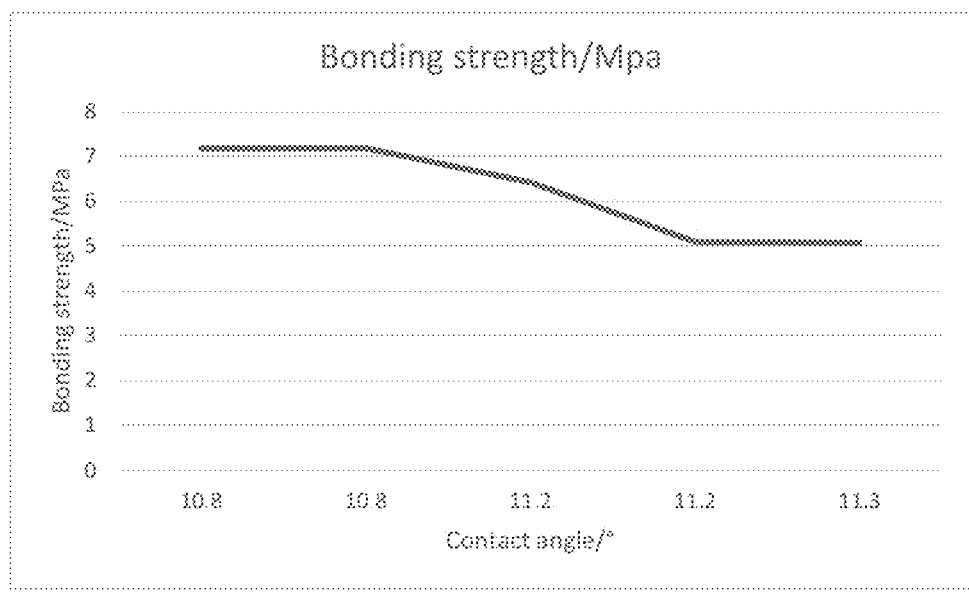
FIG. 7 is a schematic view of bonding strength in relation to the contact angle.

FIG. 7 shows the principle of the glass reacting with the microstructure layer, e.g., polymer. In this figure, it also shows that high [OH⁻] content on glass results in more active oxygen on the surface of glass, and more active glass surface, and in turn stronger bonding between the glass and the microstructure layer.

According to the present invention, the bonding strength between the glass substrate and microstructure layer is larger than 0.5 MPa, preferably higher than 1 MPa, and more preferably higher than 1.5 MPa.

In another aspect of the present invention, a method for manufacturing the micro-optical element mentioned above is provided. The method includes the following steps: polymer is deposited onto a substrate, and a UV-transparent template is positioned above; the template is pressed into the polymer and UV light is shone through the template to cure the polymer; and the template is released leaving the cured polymer with the imprinted features, i.e., microstructure layer.

In an embodiment, the microstructure layer 3 is made of modified epoxy resin, such as DELO® KATIOBOND® OM 614. In this case, when curing the microstructure layer 3 in step c), UV light in wavelength range of 320 to 380 nm is used. Briefly, the curing will be conducted for 300 seconds with UV power of 25 mW/cm². After curing, the micro-optical element is annealed at 120° C. for 1 hour.

The glass according to the present invention shows a large number of NBO, and thus, the glass has more oxygen with negative charge. The higher NBO number or more active oxygen can generate a high active glass surface with can increase the wettability of the glass surface and reduce the water/glue contact angle. The good glass surface wettability and low water/glue contact angle is good to the bonding strength of glass and the glue, i.e., microstructure layer.

What is claimed is:

1. A micro-optical element comprising:
    a glass substrate;
    a microstructure layer of polymer imprinted on the glass substrate; and
    a bonding strength between the microstructure layer and the glass substrate that is higher than 0.5 MPa,
    wherein the glass substrate has a thickness less than or equal to 1500 μm, a Total Thickness Variation (TTV) less than or equal to 40 μm, and a thickness tolerance of less than or equal to 80 μm.

2. The micro-optical element of claim 1, wherein the bonding strength is higher than 1.5 MPa, the thickness is less than or equal to 1100 μm, the TTV is less than or equal to 5 μm, and the thickness tolerance is less than or equal to 2 μm.

3. The micro-optical element of claim 1, wherein the glass substrate has a special number of Non-Bridge Oxygen (NBO) greater than or equal to 0.3, wherein NBO=(R₂O+R'O)/(P₂O₅+Al₂O₃+B₂O₃+TiO₂+ZrO₂),
    wherein R is alkali metal selected from a group consisting of Li, Na, and K; and
    R' is alkali earth metal selected from a group consisting of Mg, Ca, and Ba, and
    wherein the glass substrate has a glue contact angle of less than 35°.

4. The micro-optical element of claim 3, wherein the NBO is greater than or equal to 2 and/or wherein the glue contact angle is less than 15°.

5. The micro-optical element of claim 1, wherein the glass substrate has a ratio X=(R₂O+R'O−P₂O₅−Al₂O₃−B₂O₃)/(SiO₂+P₂O₅+Al₂O₃+B₂O₃) that is more than −0.2,
    wherein R is alkali metal selected from a group consisting of Li, Na, and K; and
    R' is alkali earth metal selected from a group consisting of Mg, Ca, and Ba, and
    wherein the glass substrate has a glue contact angle of less than 35°.

6. The micro-optical element of claim 5, wherein the ratio X is more than 0.2 and/or wherein the glue contact angle is less than 15°.

7. The micro-optical element of claim 1, wherein the glass substrate has a warp of less than or equal to 500 μm.

8. The micro-optical element of claim 1, wherein the glass substrate exhibits a ratio of the TTV to the thickness of less than 10%.

9. The micro-optical element of claim 1, wherein the glass substrate has a surface roughness (Ra) of less than or equal to 20 nm.

10. The micro-optical element of claim 1, wherein the glass substrate has a composition, in mol % based on oxide, comprising:

| Components | Proportion (mol %) |
|---|---|
| SiO2 | 60-83, |
| B2O3 | 0-12, |
| Na2O | 0-13, |
| K2O | 0-7, |
| MgO | 0-7, |
| CaO | 0-10, |
| BaO | 0-1, |
| TiO2 | 0-4, and |
| ZnO | 0-6. |

11. The micro-optical element of claim 1, wherein the glass substrate has a refractive index ($n_d$) in a range from 1.4 to 2.5.

12. The micro-optical element of claim 11, wherein the refractive index ($n_d$) is in the range from 1.45 to 1.6.

13. The micro-optical element of claim 1, wherein the glass substrate has a transmission index (T) greater than or equal to 90% and/or has a Coefficient of Thermal Expansion ($CTE_{20-300°\,C.}$) less than or equal to 15×10⁻⁶/K.

14. The micro-optical element of claim 1, further comprising a ratio of a Coefficient of Thermal Expansion of glass the glass substrate ($CTE_{glass}$) to a Coefficient of Thermal Expansion of polymer of the microstructure layer ($CTE_{polymer}$) that is less than or equal to 100.

15. The micro-optical element of claim 14, wherein the ratio is less than or equal to 80.

16. The micro-optical element of claim 1, further comprising a difference of a refractive index ($n_d$) between the glass substrate and the microstructure layer that is less than or equal to 0.5.

17. The micro-optical element of claim 1, wherein the glass substrate comprises a glass selected from a group consisting of silicate glass, borosilicate glass, aluminosilicate glass, aluminum borosilicate glass, soda lime glass, and lithium aluminum silicate glass.

18. The micro-optical element of claim 1, wherein the microstructure layer consists of a polymer of epoxy resins or acrylic resins.

19. The micro-optical element of claim 1, wherein the glass substrate has a ratio $X=(R_2O+R'O-P_2O_5-Al_2O_3-B_2O_3)/(SiO_2+P_2O_5+Al_2O_3+B_2O_3)$ that is more than 0,
  wherein R is alkali metal selected from a group consisting of Li, Na, and K; and
  R' is alkali earth metal selected from a group consisting of Mg, Ca, and Ba, and
  wherein the glass substrate has a glue contact angle of less than 35°.

20. The micro-optical element of claim 1, wherein the glass substrate has a ratio $X=(R_2O+R'O-P_2O_5-Al_2O_3-B_2O_3)/(SiO_2+P_2O_5+Al_2O_3+B_2O_3)$ that is more than 0.2,
  wherein R is alkali metal selected from a group consisting of Li, Na, and K; and
  R' is alkali earth metal selected from a group consisting of Mg, Ca, and Ba, and
  wherein the glass substrate has a glue contact angle of less than 35°.

21. A method for manufacturing a micro-optical element, comprising:
  providing a glass substrate with a thickness less than or equal to 1500 µm, a Total Thickness Variation (TTV) less than or equal to 40 µm, and a thickness tolerance of less than or equal to 80 µm; and
  applying a microstructured polymer layer to the glass substrate to form a microstructure layer such that a bonding strength between the microstructure layer and the glass substrate is higher than 0.5 MPa.

22. The method of claim 21, wherein the step of applying the microstructured polymer layer comprises homogenously applying the microstructured polymer layer using a process selected from a group consisting of spin coating, spray coating, and deposition.

23. The method of claim 21, wherein the step of applying the microstructured polymer layer comprises:
  depositing a polymer layer onto a first side of the glass substrate positioning a template above the polymer;
  pressing the template into the polymer layer;
  curing the polymer layer to a cured polymer layer;
  releasing the template from the cured polymer with features of the template imprinted therein.

24. The method of claim 23, wherein the template is a UV-transparent template and the step of curing comprises UV curing.

* * * * *